US009331524B1

(12) United States Patent
Yetter

(10) Patent No.: US 9,331,524 B1
(45) Date of Patent: *May 3, 2016

(54) METHOD, SYSTEM AND APPARATUS FOR MONITORING AND MEASURING POWER USAGE

(71) Applicant: Green Power Technologies, Inc., King of Prussia, PA (US)

(72) Inventor: Scott J. Yetter, Philadelphia, PA (US)

(73) Assignee: Best Energy Reduction Technologies, LLC, King of Prussia, PA (US)

( * ) Notice: Subject to any disclaimer, the term of this patent is extended or adjusted under 35 U.S.C. 154(b) by 278 days.

This patent is subject to a terminal disclaimer.

(21) Appl. No.: 13/772,337

(22) Filed: Feb. 21, 2013

Related U.S. Application Data

(63) Continuation-in-part of application No. 13/269,531, filed on Oct. 7, 2011, now abandoned, which is a continuation-in-part of application No. 13/162,564, filed on Jun. 16, 2011, now Pat. No. 8,093,751, which (Continued)

(51) Int. Cl.
*H02J 13/00* (2006.01)
*H02J 3/14* (2006.01)
*G06F 1/26* (2006.01)

(52) U.S. Cl.
CPC .............. *H02J 13/0006* (2013.01); *G06F 1/266* (2013.01); *H02J 3/14* (2013.01); *Y04S 20/222* (2013.01); *Y10T 307/461* (2015.04)

(58) Field of Classification Search
CPC ......... H02J 3/14; H02J 13/0006; G06F 1/266; H01R 25/003; Y02B 70/3225; Y04S 20/222; Y10T 307/461

USPC ..................... 340/3.1, 3.8, 11.4, 12.22–13.36
See application file for complete search history.

(56) References Cited

U.S. PATENT DOCUMENTS

| 5,268,666 A | 12/1993 | Michel et al. |
| 5,880,677 A | 3/1999 | Lestician |
| 6,518,724 B2 | 2/2003 | Janik |
| 6,518,980 B1 * | 2/2003 | DeMotte et al. .............. 715/762 |

(Continued)

FOREIGN PATENT DOCUMENTS

JP        2006203955 A      8/2006

OTHER PUBLICATIONS

Tenrehte's PICOwatt Smart Plug System, trademark specimen for PICOWATT trademark, May 12, 2010, accessed at www.cnet.com/news/picowatt-does-smart-grid-without-smart-meter, Jan. 7, 2010.

(Continued)

*Primary Examiner* — Hai Phan
*Assistant Examiner* — Orlando Bousono
(74) *Attorney, Agent, or Firm* — Clause Eight IPS; Michael Catania

(57) ABSTRACT

A system and method for remotely monitoring, measuring and controlling power to furniture having an electrically powered feature is disclosed herein. The furniture is preferably modular furniture (such as a cubicle) and the electrically powered feature is at least one of lighting or a power outlet. Alternatively, the furniture is a lectern and the electrically powered feature is at least one of lighting or a power outlet. Alternatively, the furniture is a charging cart and the electrically powered feature is at least one of lighting or a power outlet.

7 Claims, 11 Drawing Sheets

Related U.S. Application Data is a continuation of application No. 12/878,040, filed on Sep. 9, 2010, now Pat. No. 7,964,989.

(60) Provisional application No. 61/361,402, filed on Jul. 3, 2010, provisional application No. 61/391,663, filed on Oct. 10, 2010.

(56) References Cited

U.S. PATENT DOCUMENTS

| | | |
|---|---|---|
| 6,642,852 B2 | 11/2003 | Dresti et al. |
| 6,735,705 B1 | 5/2004 | Egbert et al. |
| 6,813,525 B2 | 11/2004 | Reid et al. |
| 6,870,463 B2 | 3/2005 | Dresti et al. |
| 7,049,939 B2 | 5/2006 | Ikeda et al. |
| 7,106,014 B1* | 9/2006 | Mastalir et al. ............... 318/280 |
| 7,117,323 B1* | 10/2006 | Delaney ........................ 711/162 |
| 7,171,461 B2 | 1/2007 | Ewing et al. |
| 7,184,848 B2 | 2/2007 | Krzyzanowski et al. |
| 7,274,303 B2 | 9/2007 | Dresti et al. |
| 7,308,611 B2 | 12/2007 | Booth |
| 7,324,006 B2 | 1/2008 | Godard |
| 7,482,708 B1 | 1/2009 | Barton |
| 7,761,186 B2 | 7/2010 | Keller et al. |
| 7,772,717 B2 | 8/2010 | Kitamura et al. |
| 8,164,876 B2 | 4/2012 | Simi |
| 8,179,653 B2 | 5/2012 | Gerlach |
| 8,185,333 B2 | 5/2012 | Jonsson et al. |
| 2002/0010518 A1* | 1/2002 | Reid et al. ........................ 700/31 |
| 2002/0043960 A1* | 4/2002 | Janik ............................ 320/128 |
| 2003/0042796 A1 | 3/2003 | Siu |
| 2003/0103304 A1 | 6/2003 | Rendic |
| 2003/0126253 A1* | 7/2003 | Ewing et al. ................... 709/223 |
| 2003/0164787 A1* | 9/2003 | Dresti et al. ................... 341/176 |
| 2004/0024913 A1* | 2/2004 | Ikeda et al. .................... 709/249 |
| 2004/0046677 A1 | 3/2004 | Dresti et al. |
| 2004/0073847 A1* | 4/2004 | Booth ............................. 714/43 |
| 2004/0107717 A1* | 6/2004 | Yoon et al. ..................... 62/230 |
| 2005/0020232 A1* | 1/2005 | Bonicatto et al. ............. 455/402 |
| 2005/0055472 A1 | 3/2005 | Krzyzanowski et al. |
| 2005/0101193 A1* | 5/2005 | Godard .......................... 439/652 |
| 2005/0162282 A1* | 7/2005 | Dresti et al. ............. 340/825.72 |
| 2005/0206241 A1* | 9/2005 | Saxena et al. ..................... 307/66 |
| 2006/0039102 A1 | 2/2006 | Lai |
| 2006/0114360 A1 | 6/2006 | Kortum et al. |
| 2006/0273663 A1* | 12/2006 | Emalfarb ....................... 307/126 |
| 2007/0008076 A1 | 1/2007 | Rodgers et al. |
| 2007/0030093 A1 | 2/2007 | Gerszberg et al. |
| 2007/0115695 A1 | 5/2007 | Lou et al. |
| 2007/0121260 A1* | 5/2007 | Sullivan .......................... 361/42 |
| 2007/0141869 A1 | 6/2007 | McNeely et al. |
| 2007/0214815 A1* | 9/2007 | Lewkowitz et al. ........... 62/235.1 |
| 2007/0297112 A1* | 12/2007 | Gilbert ........................... 361/91.5 |
| 2008/0015740 A1 | 1/2008 | Osann, Jr. |
| 2008/0100140 A1* | 5/2008 | Sorenson et al. ................ 307/40 |
| 2008/0117077 A1* | 5/2008 | Ratiu et al. ............... 340/870.02 |
| 2008/0130340 A1 | 6/2008 | Unger et al. |
| 2008/0140565 A1* | 6/2008 | DeBenedetti et al. ........... 705/39 |
| 2008/0183316 A1* | 7/2008 | Clayton ........................... 700/90 |
| 2008/0231121 A1* | 9/2008 | Yang et al. ..................... 307/131 |
| 2008/0309164 A1 | 12/2008 | Lim |
| 2009/0013210 A1 | 1/2009 | McIntosh et al. |
| 2009/0027847 A1 | 1/2009 | Li |
| 2009/0080278 A1 | 3/2009 | Schoenfeld |
| 2009/0134716 A1* | 5/2009 | Kitamura et al. ............. 307/149 |
| 2009/0149973 A1* | 6/2009 | Keller et al. ..................... 700/90 |
| 2009/0195349 A1 | 8/2009 | Frader-Thompson et al. |
| 2009/0243391 A1* | 10/2009 | Susong et al. ................... 307/66 |
| 2009/0251127 A1 | 10/2009 | Kim |
| 2009/0263704 A1* | 10/2009 | Batra .............................. 429/61 |
| 2009/0289501 A1 | 11/2009 | Garb |
| 2009/0307505 A1* | 12/2009 | Robertson et al. ............ 713/300 |
| 2010/0014205 A1* | 1/2010 | Gerlach ......................... 361/111 |
| 2010/0019575 A1* | 1/2010 | Verges ............................ 307/38 |
| 2010/0044195 A1 | 2/2010 | Chiang et al. |
| 2010/0076615 A1* | 3/2010 | Daniel et al. .................. 700/293 |
| 2010/0079001 A1 | 4/2010 | Lee et al. |
| 2010/0085894 A1* | 4/2010 | Johnson et al. ............... 370/254 |
| 2010/0096925 A1 | 4/2010 | Lee et al. |
| 2010/0148581 A1 | 6/2010 | Gupta et al. |
| 2010/0152912 A1 | 6/2010 | Huang et al. |
| 2010/0164299 A1 | 7/2010 | Lee et al. |
| 2010/0191487 A1* | 7/2010 | Rada et al. ....................... 702/60 |
| 2010/0238003 A1* | 9/2010 | Chan et al. ............... 340/310.11 |
| 2010/0250015 A1 | 9/2010 | Flikkema |
| 2010/0251157 A1 | 9/2010 | Wendt et al. |
| 2011/0058299 A1* | 3/2011 | Simi .............................. 361/111 |
| 2011/0098867 A1* | 4/2011 | Jonsson et al. ................ 700/295 |
| 2011/0128661 A1 | 6/2011 | Wiese et al. |
| 2011/0133655 A1 | 6/2011 | Recker et al. |
| 2011/0140612 A1 | 6/2011 | Mohan et al. |
| 2011/0163600 A1 | 7/2011 | Garb et al. |
| 2011/0216457 A1 | 9/2011 | Divan |
| 2011/0284726 A1 | 11/2011 | Leinen |
| 2011/0304208 A1 | 12/2011 | Lee et al. |
| 2011/0310533 A1 | 12/2011 | Cosley et al. |
| 2012/0013257 A1 | 1/2012 | Sibert |
| 2012/0014022 A1 | 1/2012 | Lin et al. |
| 2012/0023994 A1 | 2/2012 | Powell |
| 2012/0025717 A1 | 2/2012 | Klusmann et al. |
| 2012/0050936 A1 | 3/2012 | Douglass et al. |
| 2012/0086272 A1 | 4/2012 | Chen et al. |
| 2012/0086539 A1 | 4/2012 | Duval et al. |
| 2012/0112872 A1 | 5/2012 | Kang et al. |
| 2012/0134063 A1 | 5/2012 | Weil |
| 2012/0143356 A1 | 6/2012 | Berg-Sonne et al. |
| 2012/0143387 A1 | 6/2012 | Indovina et al. |
| 2012/0143810 A1 | 6/2012 | Berg-Sonne |
| 2012/0150788 A1 | 6/2012 | Berg-Sonne et al. |
| 2012/0161922 A1 | 6/2012 | Chiang et al. |
| 2012/0173035 A1 | 7/2012 | Abe |
| 2012/0209445 A1 | 8/2012 | Kim et al. |
| 2012/0239219 A1 | 9/2012 | Forbes, Jr. |

OTHER PUBLICATIONS

Design and Implementation of a High-Fidelity AC Metering Network, Presented at ACM/IEEE International Conference on Information Processing in Sensor Networks, Apr. 15-18, 2009.

"TalkingPlug Uses RFID-Enabled Power Outlets for Energy Management," Nov. 17, 2009, accessed at <http://www.rfidjournal.com/articles/view?5387>.

U.S. Appl. No. 13/622,399 Office Action, dated Dec. 16, 2013.

U.S. Appl. No. 13/624,970 office Action, dated Apr. 23, 2014.

Written Opinion of the ISA for PCT/US2011/042889, Feb. 24, 2012, for a related parent application.

* cited by examiner

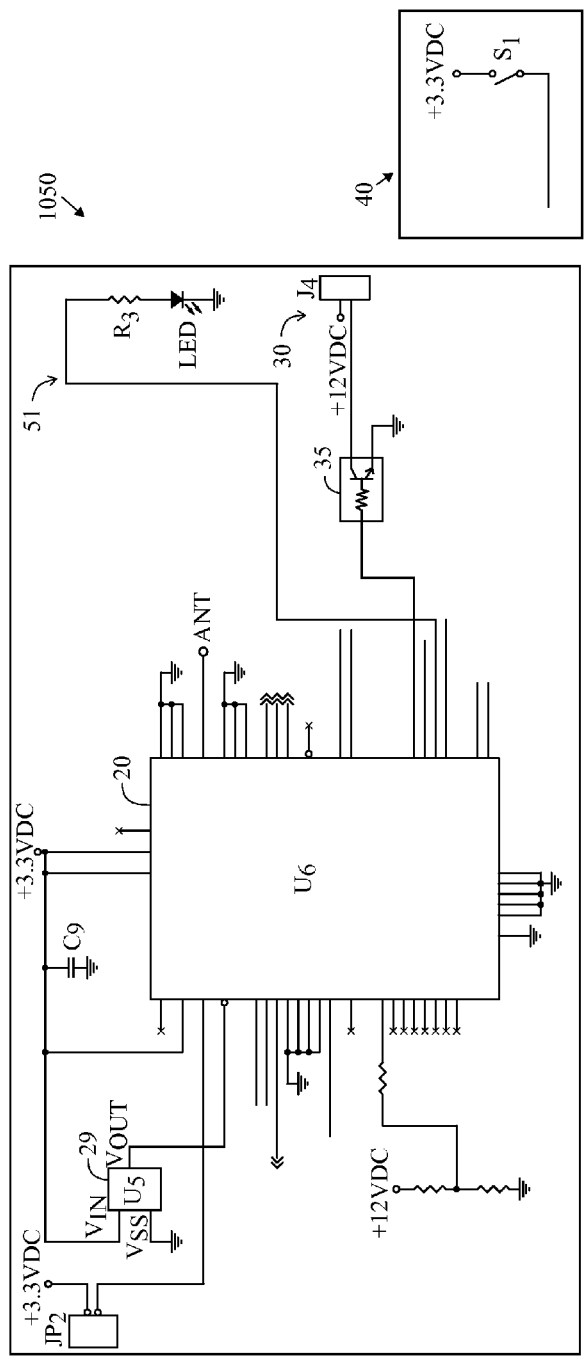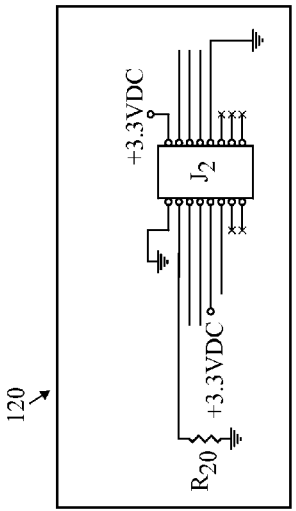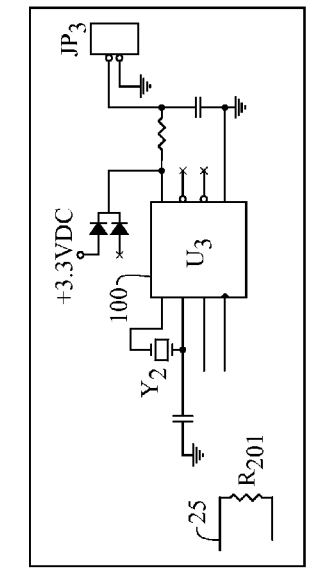
FIG. 4
FIG. 4A
FIG. 5
FIG. 6

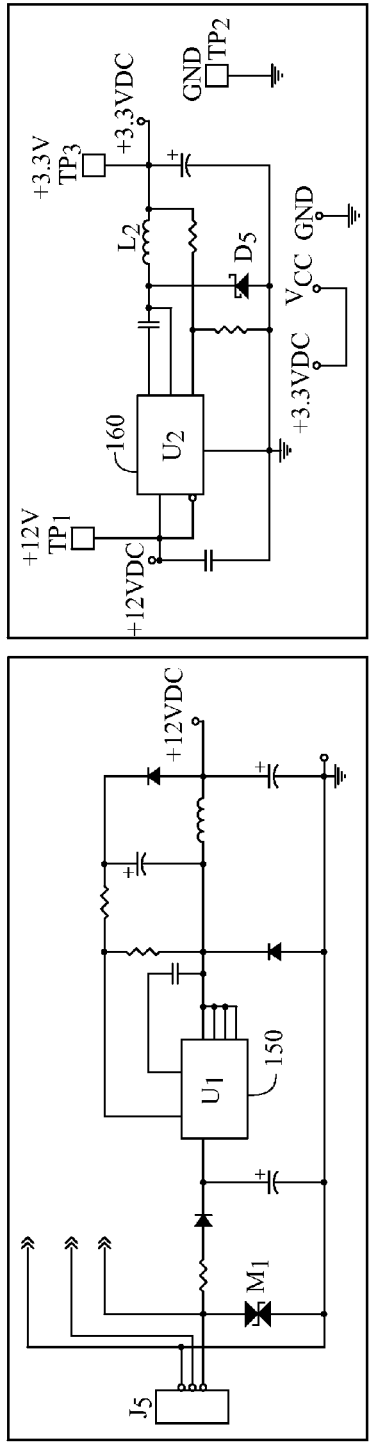
FIG. 7
FIG. 8
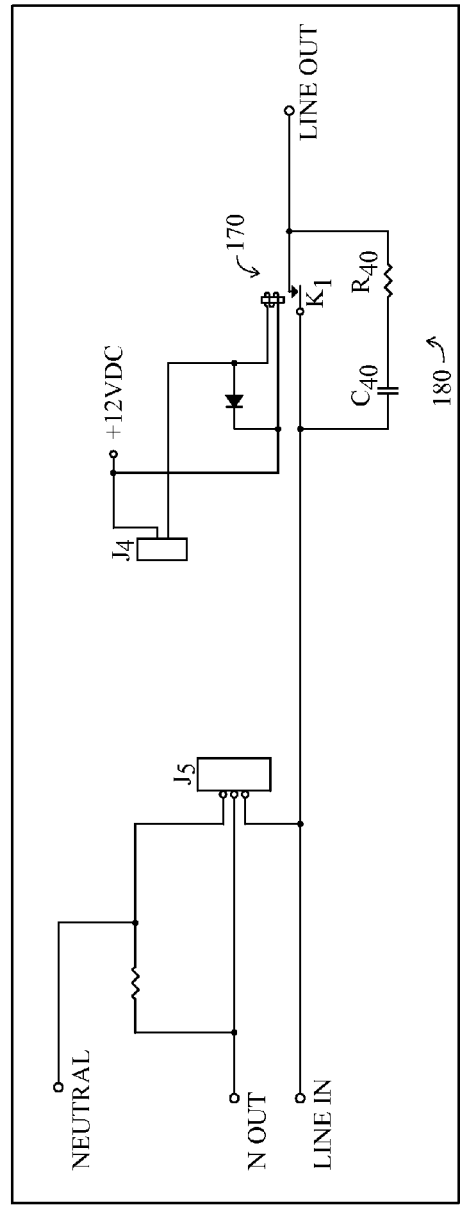
FIG. 9

METHOD, SYSTEM AND APPARATUS FOR MONITORING AND MEASURING POWER USAGE

CROSS REFERENCES TO RELATED APPLICATIONS

The Present Application is a continuation-in-part application of U.S. patent application Ser. No. 13/269,531, filed on Oct. 7, 2011, which claims priority to U.S. Provisional Patent Application No. 61/391,663, filed on Oct. 10, 2010, and is a continuation-in-part Application of U.S. patent application Ser. No. 13/162,564, filed on Jun. 16, 2011, now U.S. Pat. No. 8,093,751, issued on Jan. 10, 2012, which is a continuation application of U.S. patent application Ser. No. 12/878,040, filed on Sep. 9, 2010, now U.S. Pat. No. 7,964,989, issued on Jun. 21, 2011, which claims priority to U.S. Provisional Patent Application No. 61/361,402, filed on Jul. 3, 2010, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to monitoring, measuring and controlling power to furniture having an electrically powered featured. More specifically, the present invention relates to a system, method and apparatus for monitoring, measuring and controlling power to furniture having an electrically powered feature.

2. Description of the Related Art

The prior art discusses various method and systems for controlling power to an electrically power device.

One example is Dresti et al., U.S. Pat. No. 6,642,852 for a Remote Control Device With Appliance Power Awareness which discloses placing a device in a desired powered state through use of a infrared remote with radiofrequency capabilities.

Another is Lou et al, U.S. Patent Publication Number 2007/0115695 for a Power Supply With Low Standby Loss.

Yet another is Ewing et al., U.S. Pat. No. 7,171,461 for a Network Remote Power Management Outlet Strip.

Yet another is Lee et al., U.S. Publication Number 2010/0079001 for a Outlet Switch Socket Device.

The prior art fails to disclose a system and method for remotely monitoring and controlling power to furniture having an electrically powered feature.

BRIEF SUMMARY OF THE INVENTION

The present invention provides a system and method for monitoring and controlling power to an electrically powered device. The present invention provides an effective component for power savings, control and customization for commercial and residential buildings.

The present invention is a system for power control with remote Wi-Fi management using web based user interfaces accessible by a home PC, an office laptop or a smartphone such as an iPHONE available from Apple, Inc. The system is applicable to commercial and residential buildings. The features afforded to end-users (commercial building managers or homeowners) by the present invention allow for substantial reduction in energy consumption without having to rewire a building.

The present invention is designed and positioned as an easy to use and safe enhancement for controlling power to furniture having electrical powered features by building managers, information technology managers and homeowners. The present invention relies on existing protocols to adhere to all necessary safety and regulatory requirements.

One aspect of the present invention is system for monitoring and controlling electrical power to furniture. The system comprises at least one piece of furniture, a power control assembly, and a controller. The at least one piece of furniture has an electrically-powered feature. The power control assembly comprises a processor configured to monitor and measure a power usage through the assembly, and a transceiver for receiving commands to the assembly and for transmitting power usage data from the assembly. The power control assembly is integrated into the piece of furniture and is in electrical communication with the electrically-powered feature. The controller transmits a plurality of commands to the power control assembly. A command of the plurality of commands from the controller can control electrical power to the electrically powered feature through the processor of the assembly which is configured to control electrical power to the electrically powered feature. The controller receives power usage data for the electrically-powered feature from the transceiver of the power control assembly.

The furniture is preferably modular furniture (such as a cubicle) and the electrically powered feature is at least one of lighting or a power outlet. Alternatively, the furniture is a lectern and the electrically powered feature is at least one of lighting or a power outlet. Alternatively, the furniture is a charging cart and the electrically powered feature is at least one of lighting or a power outlet.

Another aspect of the present invention is a power control assembly for monitoring and controlling electrical power to a piece of furniture. The assembly comprises an input connection to receive power, an output connection to distribute power to an electrically powered feature of the cubicle, means for controlling power to the output connection, a processor configured to instruct the power controlling means to enable electrical power to the output connection and to disable electrical power to the output connection, and a transceiver for receiving a plurality of commands to the assembly and for transmitting power usage data from the assembly. The processor is also configured to monitor and measure a power usage through the assembly. The power controlling means is electrically positioned between the output connection and the input connection. The transceiver is in electrical communication with the processor. A command of the plurality of commands can control electrical power to the electrically powered device through the processor of the assembly. The power control means is preferably a latch relay or an electro-mechanical relay. Alternatively, the power control means is an electrical relay.

Yet another aspect of the present invention is a method for monitoring and controlling electrical power to a piece of furniture. The method includes monitoring and measuring a power usage of at least one electrically powered feature of a piece of furniture integrated with a power control assembly. The method also includes transmitting the power usage of the electrically powered feature to a remote controller. The method also includes transmitting a command from the remote controller over a network, the command to disable power to the electrically powered feature. The method also includes receiving the command at a transceiver of the power control assembly. The method also includes communicating the command from the transceiver to a processor of the power control assembly. The method also includes switching power from an enabling state to a disabling state to disable power to the electrically powered feature. The method also includes transmitting a response to the remote controller from the transceiver of the power control assembly, the response updating the status of the electrically powered feature. The method also includes receiving the response from the power control assembly over the network at the remote controller.

The method further includes storing the power usage data by one of hour, day, week, month and year.

The method preferably uses a WiFi communication format.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 4 is a circuit diagram of power control assembly utilized with the system and method for monitoring and controlling electrical power usage to furniture with an electrically powered feature.

FIG. 4A is a circuit diagram of a user switch utilized with the system and method for monitoring and controlling electrical power usage to furniture with an electrically powered feature.

FIG. 5 is a circuit diagram of a component utilized with the system and method for monitoring and controlling electrical power usage to furniture with an electrically powered feature.

FIG. 6 is a circuit diagram of a component utilized with the system and method for monitoring and controlling electrical power usage to furniture with an electrically powered feature.

FIG. 7 is a circuit diagram of a component utilized with the system and method for monitoring and controlling electrical power usage to furniture with an electrically powered feature.

FIG. 8 is a circuit diagram of a component utilized with the system and method for monitoring and controlling electrical power usage to furniture with an electrically powered feature.

FIG. 9 is a circuit diagram of a component utilized with the system and method for monitoring and controlling electrical power usage to furniture with an electrically powered feature.

DETAILED DESCRIPTION OF THE INVENTION

Figure 1:
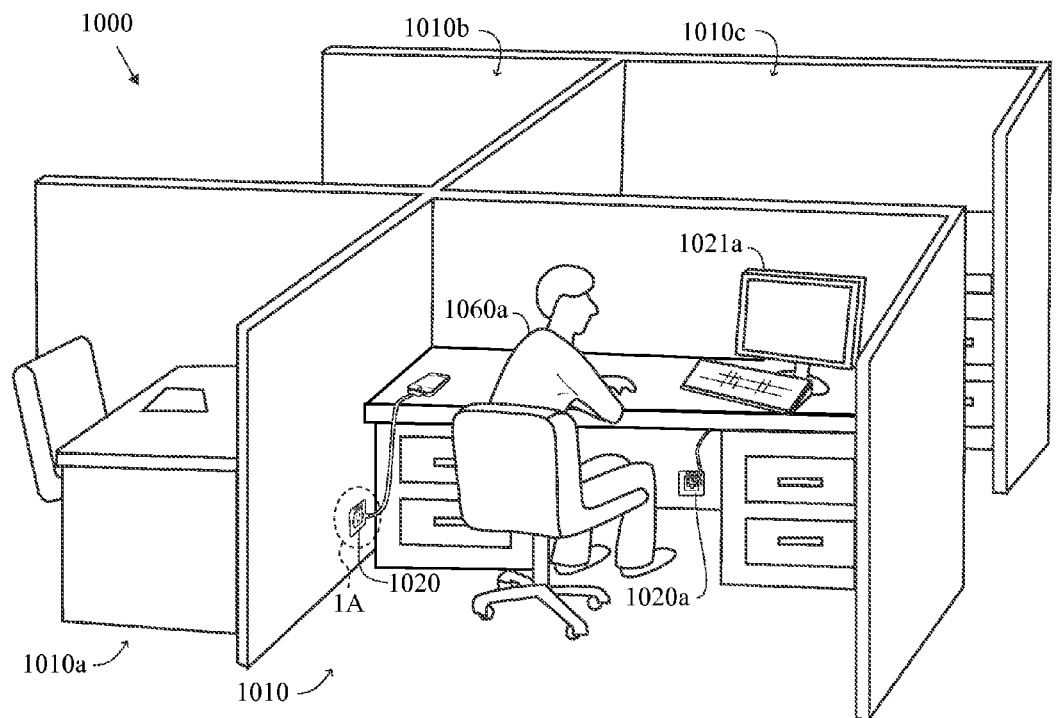
FIG. 1 is an illustration of a cubicle with an electrically powered feature integrated with a power control assembly.
Figure 1A:
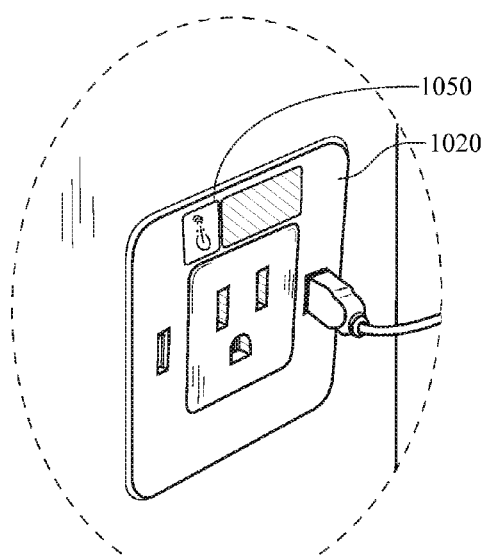
FIG. 1A is an isolated view of circle 1A of FIG. 1 showing a power outlet of the cubicle.

A preferred embodiment of a system 1000 utilized for monitoring and controlling electrical power usage to furniture with an electrically powered feature is shown in FIGS. 1 and 1A, in the form of a cubicle 1010 having a power outlet 1020. The power outlet 1020 is controlled by a power control assembly 1050, which is integrated into the cubicle 1010. A smartphone 1021 of a worker 1060a is plugged into the power outlet connection 1020. A second power outlet 1020a is also controlled by the power control assembly 1050. A computer 1021a is connected the second power outlet 1020a. The power control assembly 1050 preferably controls power to the entire cubicle 1010, controlling the power outlets 1020 and the lighting.

Figure 2:
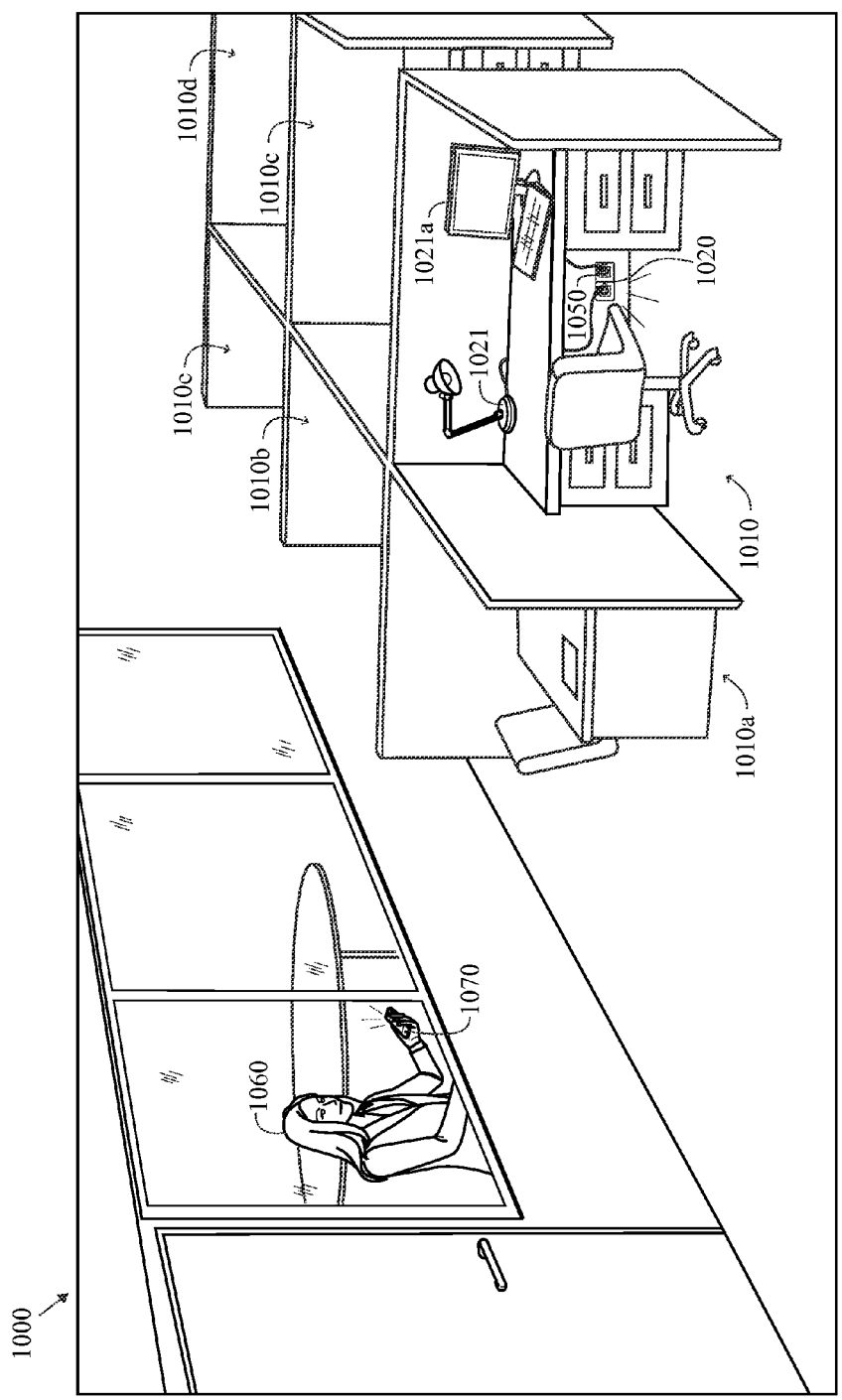
FIG. 2 is an illustration of a system for monitoring and controlling electrical power usage to furniture with an electrically powered feature integrated with a power control assembly.
Figure 2A:
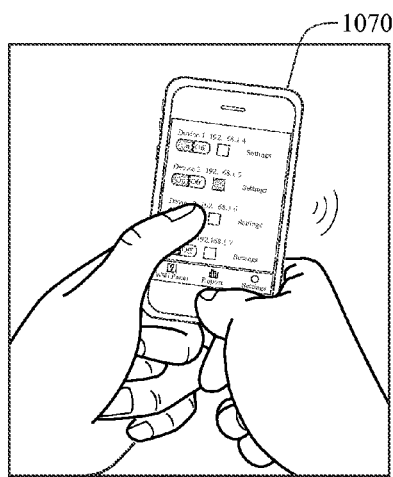
FIG. 2A is an isolated view of a controller of the system for monitoring and controlling electrical power usage to furniture with an electrically powered feature integrated with a power control assembly shown in FIG. 2.
Figure 2B:
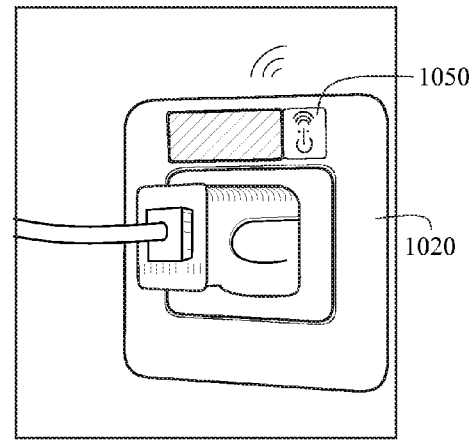
FIG. 2B is an isolated view of a power outlet of the system for monitoring and controlling electrical power usage to furniture with an electrically powered feature integrated with a power control assembly shown in FIG. 2.

Another illustration of a system 1000 utilized for monitoring and controlling electrical power usage to furniture with an electrically powered feature is shown in FIGS. 2, 2A and 2B, in the form of a cubicle 1010 having a power outlet 1020. The power outlet 1020 is controlled by a power control assembly 1050, which is integrated into the cubicle 1010. A controller 1070 of a user 1060 is utilized to monitor and control power to the cubicle 1010 with an electrically powered feature. A power outlet 1020, an electrically powered feature, is controlled by the power control assembly 1050. A computer 1021a is also connected the second power outlet 1020. The power control assembly 1050 preferably controls power to the entire cubicle 1010, controlling the power outlets 1020 and the lighting. The user 1060 controls the power to the cubicle 1010 from a distance using the touch screen commands on the controller (smartphone) 1070. A WiFi signal is sent from the smartphone 1070 and received at the antenna, not shown, of the transceiver of the power control assembly 1050. The WiFi signal instructs the microprocessor of the power control assembly 1050 to deactivate the electrical power to the table lamp 1021.

Figure 3:
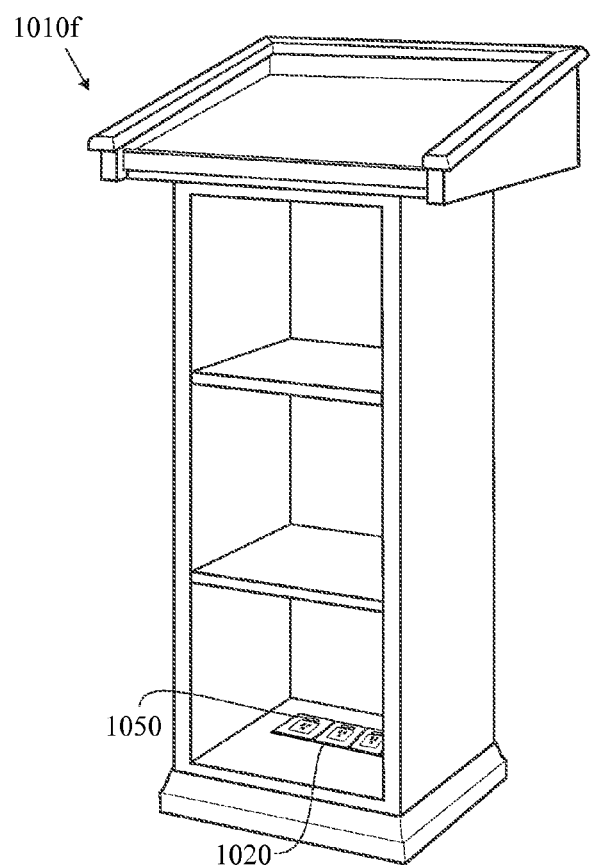
FIG. 3 is an illustration of a lectern with an electrically powered feature integrated with a power control assembly.
Figure 10:
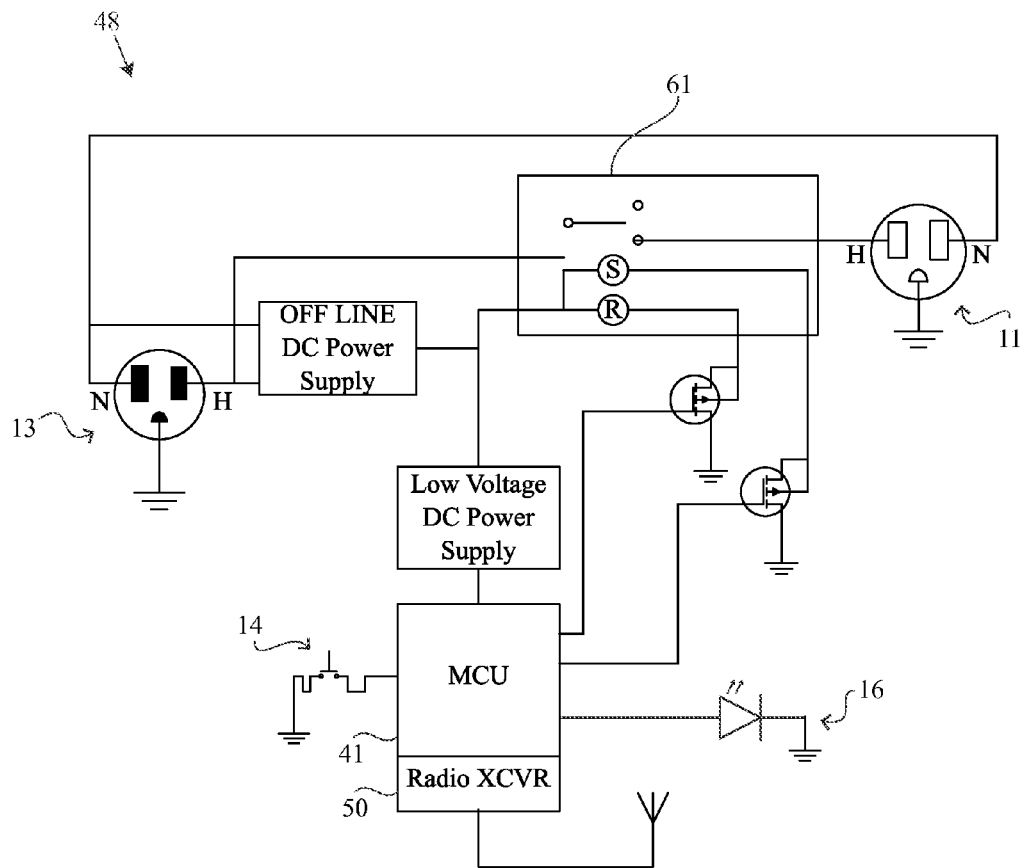
FIG. 10 is a circuit diagram of a component utilized with the system and method for monitoring and controlling electrical power usage to furniture with an electrically powered feature.

FIG. 3 illustrates yet another embodiment of a component of the system for monitoring and controlling electrical power usage to furniture with an electrically powered feature. A lectern 1010a has a power outlet 1020 controlled by a power control assembly 1050. As discussed above with reference to the cubicle 1010, the power to the lectern 1010a is monitored and controlled by the power control assembly 1050, allow for a remote controller 1070 (not shown) to be monitor and control power.

FIGS. 4-10 illustrate circuit diagrams of components of the system for monitoring and controlling electrical power usage to furniture with an electrically powered feature.

FIG. 4 a circuit diagram of the power control assembly 1050. The power control assembly 1050 comprises at least a radio transceiver, a microprocessor, a switch, and a power converter. Additionally, light-emitting diodes (LED) provide status indication.

The plug 13 is used to receive alternating current (AC) power, and the switch 61 is connected in between the socket 11 and the plug 13.

The microprocessor receives direct current (DC) power, decodes a control signal from a remote control, such as a handheld device, via the radio transceiver, and then controls the switch based on the decoded control signal.

The switch is preferably a latching relay controlled by the microprocessor, according to the control signal received from the remote control device. Alternatively, the switch is an electro-mechanical relay. Yet alternatively, the switch is an electrical The latching relay minimizes the power usage of the electrical device connected to the apparatus 10, independent of the state of the switch 61.

Further embodiments of the present invention include additional onboard energy storage, with sensing or measuring capabilities, in various form factors embedded or interfaced with various electrical. Additional embodiments of the present invention include combining a single or multiple energy harvesting sources to provide power to control the relay.

Figure 11:
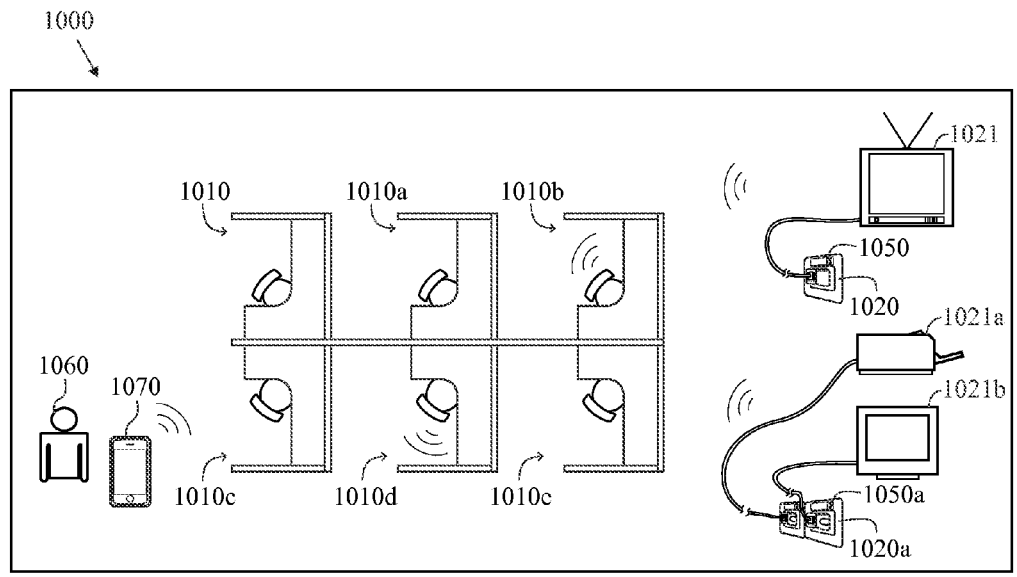
FIG. 11 is a block diagram of a system for monitoring and controlling electrical power usage to furniture with an electrically powered feature.
Figure 11A:
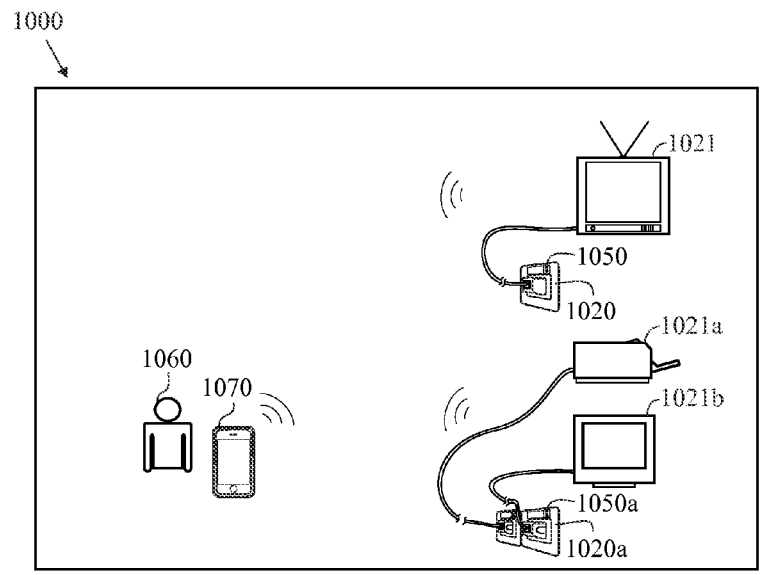
FIG. 11A is a block diagram of a system for monitoring and controlling electrical power usage to furniture with an electrically powered feature.
Figure 12:
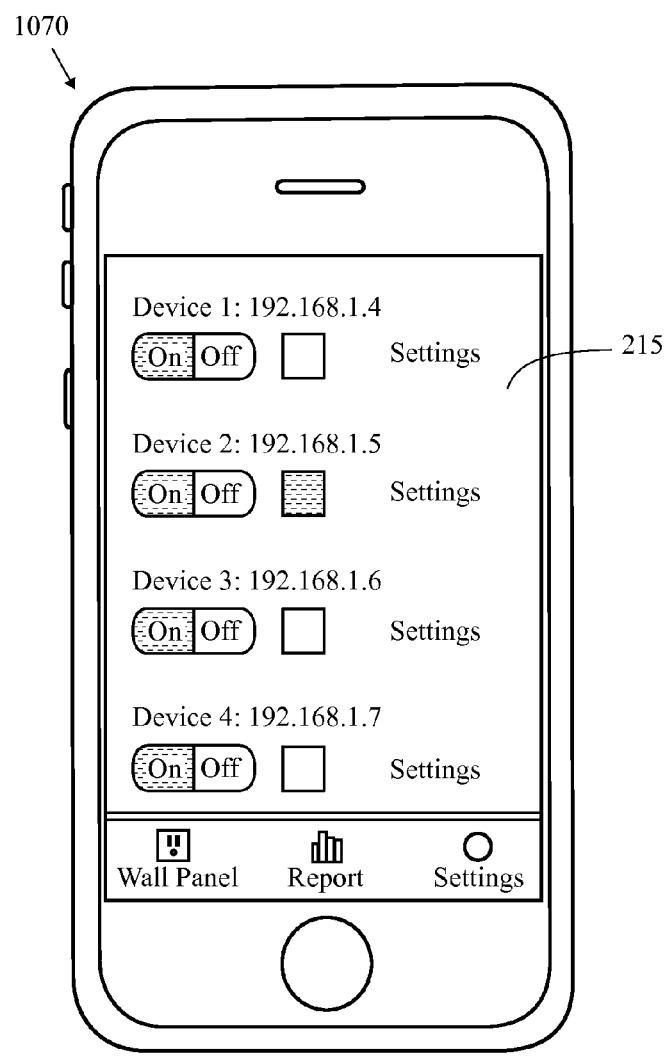
FIG. 12 is a front view of a smart phone for use with a system and method for monitoring and controlling electrical power usage to furniture with an electrically powered feature.

A system 1000 of the preferred embodiment is shown in FIGS. 11 and 11A. Each of a plurality of cubicles 1010, 1010a, 1010b, 1010c, 1001d and 1010e has power control assembly 1050 for controlling an electrically powered feature of the cubicle. A television 1021, a printer 1021a and a desktop computer 1021b are controlled by power control assemblies 1050 through an outlet 1020. A user 1060 controls power to the cubicles 1010, 1010a, 1010b, 1010c, 1001d and 1010e from a distance using the touch screen commands on a touch screen display 215 of the smartphone 1070, as shown in FIG. 12. A WiFi signal is sent from the smartphone 1070 and received at the antenna 50, not shown in FIG. 11, of the transceiver of the power control assembly 1050. The WiFi signal instructs the microprocessor 41 of the power control assembly 1050 to deactivate the electrical power to the cubicles 1010, 1010a, 1010b, 1010c, 1001d and 1010e.

The power control assembly 1050 permits the user to configure the power control assembly 1050 out of the box using a web user interface (WebUI), a personal computer ("PC") program or a WiFi enabled hand held device (smartphone) via ad-hoc wireless, allowing the user to program in home network information, such as the wireless router SSID (Service Set Identifier) and security keys, as necessary for web connectivity.

The WebUI is preferably hosted on the power control assembly 1050 and is accessible via interconnected network devices. The WebUI, PC program or WiFi enabled hand held is addressable via the assigned IP address of the power control assembly 1050. The power control assembly 1050 can be controlled from various devices such as, but not limited to, computers or mobile handhelds. In a typical network, a router and the access point provide the wireless connectivity between the power control assembly 1050 and the remote, such as a smartphone 1070. In an alternative embodiment of the system, the mobile handheld device 1070 wirelessly communicates directly with the antenna of the power control assembly 1050 preferably using a WiFi communication protocol.

FIG. 12 shows a smartphone 1070 displaying touch screen commands of an application for controlling power to cubicles having electrically powered features.

The first installed power control assembly 1050 is preferably the master power control assembly 1050 and monitors the network for any additional apparatus 10b. When a new apparatus 10b is detected on the network, the first installed power control assembly 1050 remotely manages other power control assembly 1050 using a single WebUI, PC program or WiFi enabled hand held. The user will either: a) logon to the original power control assembly 1050 and have selectable tabs and additional options to manage all of the power control assembly 1050 on the network; or b) manage each power control assembly 1050 discretely using individual IP addresses. Local user settings to the individual power control assembly 1050 supersede commands and/or timers from the master power control assembly 1050. The power control assembly 1050 is compatible with various web browsers such as, but not limited to, Mozilla Firefox, Microsoft Explorer and Google Chrome.

Figure 13:
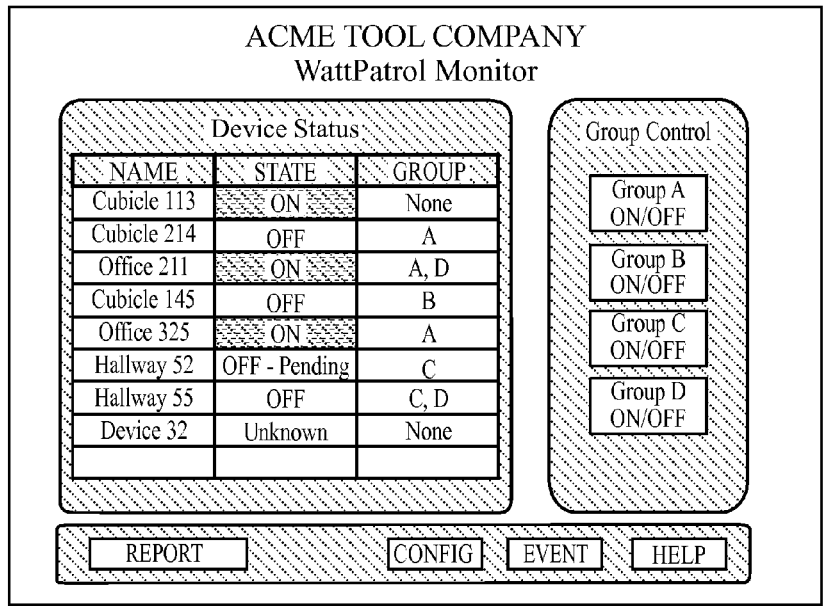
FIG. 13 is a screen view of a status chart of a system for monitoring and controlling electrical power usage to furniture with an electrically powered feature.

A simple WebUI home page allows individual management and supervision of each cubicle such as, but not limited to, setting multiple timers and toggling ON/OFF selections of multiple cubicles. An example of a web page, of a status window 190, is shown in FIG. 13. The status page 190 displays the status of the devices and users can turn devices OFF or ON from this page.

Figure 14:
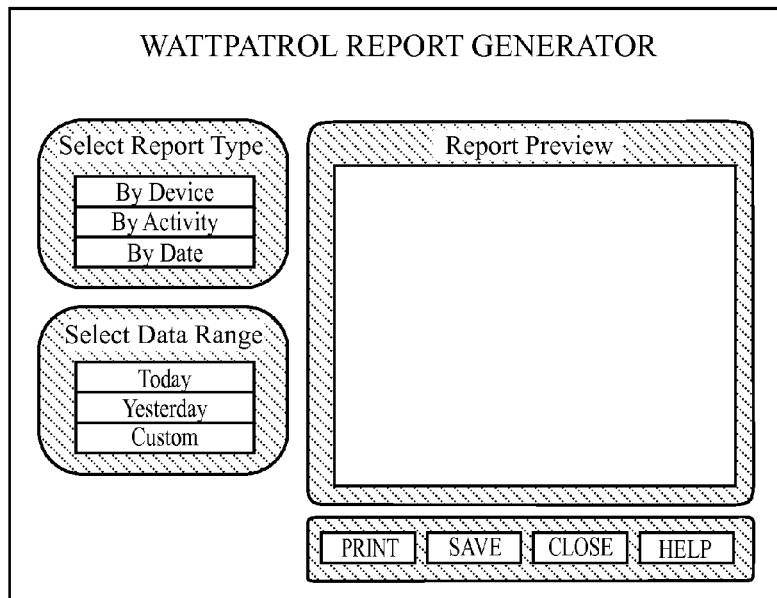
FIG. 14 is a screen view of a report generated by a system for monitoring and controlling electrical power usage to furniture with an electrically powered feature.

FIG. 14 shows another example of a web page, a report window 200 that a user can access to generate a report in order to analyze or compare the consumption of energy by devices or activities or dates.

Figure 15:
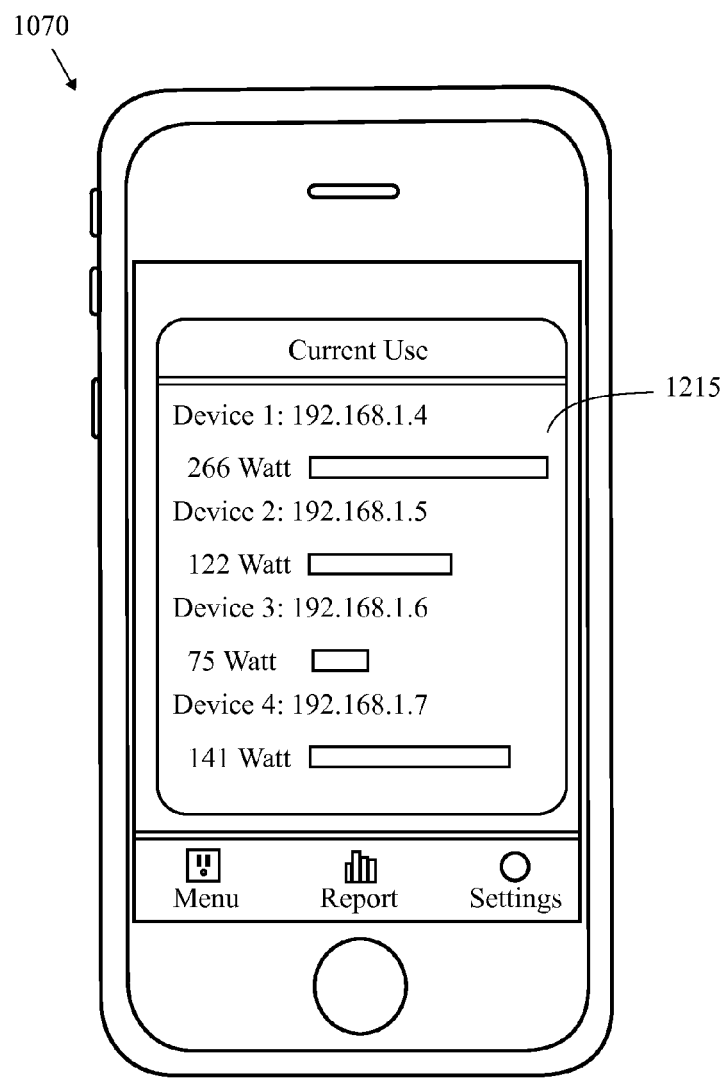
FIG. 15 is a front view of a smart phone for use with a system and method for monitoring and controlling electrical power usage to furniture with an electrically powered feature.

FIG. 15 is a screen view of an IPHONE mobile device 1070 being used as a controller of a system for controlling power to an electrically powered device. The screen 1215 shows the devices in current use and the wattage used at the current time. For example, Device 1 could be a laptop being used.

Further details of power control and monitoring is described in U.S. Pat. Nos. 7,964,989 and 8,093,751 which are hereby incorporation by reference in their entireties. Further details of power control and monitoring is described in U.S. patent application Ser. No. 13/622,399 filed on Sep. 19, 2012 for a Method, System And Apparatus For Controlling Power To A Device is hereby incorporated by reference in its entirety. Further details of power control and monitoring is described in U.S. patent application Ser. No. 13/624,970 filed on Sep. 24, 2012 for a Method, System And Apparatus For Monitoring And Measuring Power To A Device is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A system for monitoring and controlling electrical power to a cubicle, the system comprising:
   a facility having a source of electrical power;
   a cubicle having a plurality of walls;
   a first electrically-powered device positioned within the cubicle;
   a second electrically-powered device positioned within the cubicle;

a power control assembly comprising
- a processor configured to monitor and measure data for electrical power usage through the power control assembly,
- a first power outlet in a first wall of the plurality of walls having an alternating current socket and a USB socket,
- a second power outlet in a second wall of the plurality of walls,
- a relay between the source of electrical power and the first power outlet and the second power outlet wherein the relay is a latching relay, an electro-mechanical relay or an electrical relay, and
- a wireless transceiver for receiving a plurality of commands to the power control assembly and for transmitting data for electrical power usage from the power control assembly,
- wherein the power control assembly is integrated into a wall of the plurality of walls of the cubicle and in hard wired electrical communication with the source of electrical power;
- wherein the first electrically-powered device is connected to the first power outlet, and the second electrically-powered device is connected to the second power outlet; and
- a controller for transmitting the plurality of commands to the power control assembly;
- wherein a command of the plurality of commands from the controller can control electrical power to the first electrically-powered device and the second electrically-powered device through the processor of the power control assembly which is configured to control electrical power to the first electrically-powered device and the second electrically-powered device, and wherein the controller receives data for electrical power usage for the first electrically-powered device and the second electrically-powered device from the wireless transceiver of the power control assembly.

2. The system according to claim 1 wherein the controller is a smart phone, a computer, or a mobile phone.

3. The system according to claim 1 wherein the system utilizes an 802.11 communication format.

4. A method for monitoring and controlling electrical power to a cubicle within a facility, the method comprising:
- monitoring and measuring data for electrical power usage of a first electrically powered feature and a second electrically-powered feature both positioned within a cubicle within a facility, the cubicle having a plurality of walls, a power control assembly integrated into a wall of the plurality of walls of the cubicle, the power control assembly hard wired into an electrical power source for the facility and wherein a relay is electrically positioned between the electrical power source and a first power outlet having an alternating current outlet socket and a USB socket, and the relay also electrically positioned between the electrical power source and a second power outlet having an alternating current outlet socket;
- wirelessly transmitting the data for electrical power usage of the first electrically powered feature and the second electrically-powered feature to a remote controller;
- wirelessly transmitting a command from the remote controller over a network, the command to disable power to the first electrically powered feature and the second electrically-powered feature;
- receiving the command at a transceiver of the power control assembly;
- communicating the command from the transceiver to a processor of the power control assembly;
- switching power from an enabling state to a disabling state to disable power to the first electrically powered feature and the second electrically-powered feature by utilizing the relay of the power control assembly to disable electrical power to the first electrically powered feature and the second electrically-powered feature;
- wirelessly transmitting a response to the remote controller from the transceiver of the power control assembly, the response updating a status of the first electrically powered feature and the second electrically-powered feature; and
- receiving the response from the power control assembly over the network at the remote controller.

5. The method according to claim 4 wherein the remote controller is a smartphone.

6. The method according to claim 4 wherein the remote controller is a personal computer.

7. The method according to claim 4 wherein the network is the Internet.

* * * * *